(No Model.)
W. BRYDEN.
HORSESHOE.
No. 421,349. Patented Feb. 11, 1890.
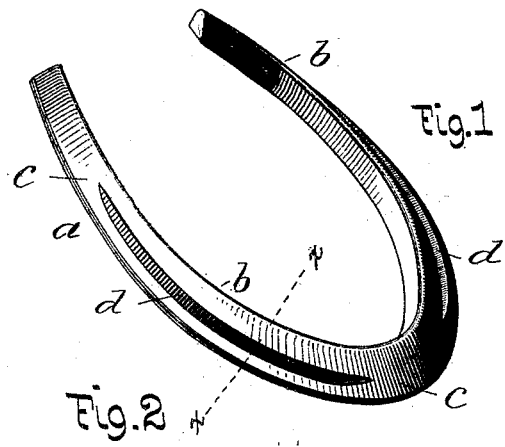
Fig. 1
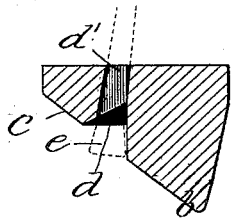
Fig. 2
Fig. 3
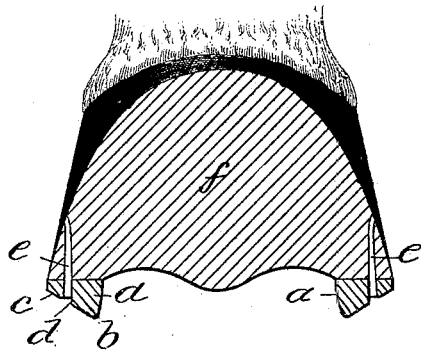
Fig. 4
Fig. 5
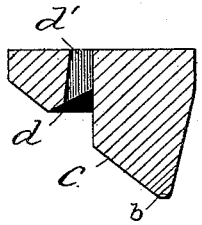
Witnesses
Frank H. Pierpont
G. W. Royer
Inventor
William Bryden
By his Attorneys
Simonds & Burdett

UNITED STATES PATENT OFFICE.

WILLIAM BRYDEN, OF CHELSEA, MASSACHUSETTS, ASSIGNOR OF ONE-HALF TO GEORGE BRYDEN, OF HARTFORD, CONNECTICUT.

HORSESHOE.

SPECIFICATION forming part of Letters Patent No. 421,349, dated February 11, 1890.

Application filed May 6, 1887. Serial No. 237,377. (No model.)

*To all whom it may concern:*

Be it known that I, WILLIAM BRYDEN, of Chelsea, in the county of Suffolk and State of Massachusetts, have invented certain new and useful Improvements in Horseshoes, of which the following is a full, clear, and exact description, whereby any one skilled in the art can make and use the same.

The object of my invention is to provide a horseshoe that shall give a more even and at the same time a more perfect and a more secure bearing-surface on the face of the shoe than has been previously known or used; also to provide a shoe that enables calks to be dispensed with in a great measure, and also to provide a shoe by means of which certain ailments of the foot are relieved or prevented.

To this end my invention consists in a horseshoe having an angular cross-section of such shape that the narrow bearing-surface or edge is located substantially directly below the inner edge of the shoe, coming under the sole of the foot within the shell; and it further consists in the peculiar details of construction of the shoe as to shape in cross-section, location, and form of bearing-surface, and the location of the nail-groove in the inclined outer surface of the shoe, as more particularly hereinafter described, and pointed out in the claim.

Referring to the drawings, Figure 1 is a perspective view of a horseshoe that embodies my improvement. Fig. 2 is a detail view, in section, across the shoe on plane denoted by line $x\,x$ of Fig. 1. Fig. 3 is a view showing in vertical section the hoof of a horse as shod with a shoe of the prior art. Fig. 4 is a like view, in vertical section, showing the same hoof as shod with my improved shoe. Fig. 5 is a detail view, in cross-section, of the preferred form or my improved shoe.

As a result of many years' study and experience, I have discovered that most of the ailments to which horses are subject, so far as their locomotive organism is concerned, are due to the imperfect understanding of the needs and requirements of the hoof of the animal. Owing to a peculiar growth of the hoof in some instances, which may be the result of hereditary causes or of shoeing or improper use, although perhaps to the greatest extent due to improper shoeing and badly-formed shoes, interfering, overreaching, and other peculiarities of gait and action are caused. As usually made, the shoes are fastened to the shell of a horse's hoof by nails driven into it, and by the beveling of the upper surface of the shoe the greater bearing is brought upon this shell, rather than on the sole of the foot.

One object of my within-described improvement is to concentrate the bearing-surface of the shoe and bring it onto the sole of the hoof, rather than on the shell, using the latter as the part to which the shoe is properly secured by nails.

Another object is to enable the horse to secure a quicker and better hold on the roadway, and to provide a shoe that is free from any projections on the sides that, when they exist, cause a horse to cut itself in moving the feet.

In the accompanying drawings, the letter $a$ denotes a horseshoe that is formed of a bar of metal or like piece of stock that is bent in any convenient manner to the usual shape for use as a shoe. This shoe has a comparatively flat upper surface formed in one plane, and on the under surface the edge or bearing $b$, with the outer wall or bevel $c$, the latter extending substantially around the whole length of the shoe; but it is essential to my improvement that this peculiar bevel shall extend around what may be termed the "front half" of it and along the sides where the nail-creases $d$ are formed. The usual nail-crease $d$, that forms a recess for the heads of the nails $e$, by which the shoe is secured to the hoof of the horse, is formed in the outer surface or wall $c$ of the shoe, and the nail-holes are inclined inward in such manner that when a nail is driven into the hoof it will be guided by the walls of the nail-hole, so as to lie in the hoof in the position indicated in Fig. 4 of the drawings. The inner wall of the shoe that rises from the bearing-surface $b$ may be vertical or slightly inclined outward, the latter being preferred.

This improved shoe, when secured to the hoof $f$ of the horse, gives a bearing-surface, measuring from outside to outside, that in width is about the thickness through the coronet, and this concentrates the bearing within the outer edge of the hoof—that is, under the sole, and not on the shell of the hoof—and it avoids causing any tipping of the hoof in a manner that, if done, is the cause of a horse's interfering.

The relative bearing-surface of the shoe of the prior art and my improved shoe is shown by a comparison of Figs. 3 and 4 of the drawings. The bearing-surface $b$ is a somewhat sharp edge, and it forms, in fact, a continuous edge along the bottom of the shoe, so that a horse shod with such a shoe does not need any of the projecting calks that are in common use on prior shoes.

My improved horseshoe affords a surer hold on a roadway that is paved with either Belgian blocks or cobble-stones, and with its use there is less concussion of the hoof on a dirt road, and these advantages facilitate the action and increase the speed and sure-footedness of the animal. The location of the bearing-edge $b$ near the inner edge of the shoe gives the long beveled outer surface $c$, in which the nail-crease is located, and it for the first time provides in the art a shoe with the nail-crease so located that a smaller nail can be used than in an old shoe, and it so removes the head of the nail from contact with the ground that the improved shoe will stand several days' wear before the clinch of the nails is so driven up as to require tightening, and this is a distinct improvement over prior shoes. A particular advantage in the use of the small nails is that they do not enter the hoof to the extent of larger nails required in prior shoes, and they are not so apt to crack out, while they are of ample strength to hold the shoe.

I claim as my improvement—

As an improved article of manufacture, the horseshoe $a$, formed of a bar of metal bent to shape and having the continuous narrow bearing-surface $b$ along the under side of the shoe and located under the inner edge, the wide outer bevel $c$, and the nail-crease located in the said outer bevel, all substantially as described.

WILLIAM BRYDEN.

Witnesses:
 EBEN HUTCHINSON,
 C. WILLIS GOULD.